(12) United States Patent
Martel et al.

(10) Patent No.: US 9,224,308 B2
(45) Date of Patent: Dec. 29, 2015

(54) FOLDABLE FLIGHT SIMULATOR

(71) Applicants: James Martel, Palm Bay, FL (US);
David Jorgensen, Windermere, FL (US);
Dan Diorio, Orlando, FL (US);
Fernando Piernavieja, Orlando, FL (US); Javier Gonzalez, Orlando, FL (US); Mike Maier, St. Cloud, FL (US)

(72) Inventors: James Martel, Palm Bay, FL (US);
David Jorgensen, Windermere, FL (US);
Dan Diorio, Orlando, FL (US);
Fernando Piernavieja, Orlando, FL (US); Javier Gonzalez, Orlando, FL (US); Mike Maier, St. Cloud, FL (US)

(73) Assignee: INDRA SYSTEMS, INC., Winter Park, FL (US)

( * ) Notice: Subject to any disclaimer, the term of this patent is extended or adjusted under 35 U.S.C. 154(b) by 321 days.

(21) Appl. No.: 13/842,105

(22) Filed: Mar. 15, 2013

(65) Prior Publication Data
US 2014/0272809 A1  Sep. 18, 2014

(51) Int. Cl.
*G09B 9/30* (2006.01)
*G09B 9/12* (2006.01)

(52) U.S. Cl.
CPC ... *G09B 9/30* (2013.01); *G09B 9/12* (2013.01)

(58) Field of Classification Search
CPC .......................................... G09B 9/30
USPC ............................................... 434/38
See application file for complete search history.

(56) References Cited

U.S. PATENT DOCUMENTS

| | | | |
|---|---|---|---|
| 1,543,892 A | 6/1925 | Willard | |
| 5,158,459 A | 10/1992 | Edelberg | |
| 6,256,078 B1 | 7/2001 | Ogata | |
| 6,331,114 B1 | 12/2001 | Massey | |
| 6,790,041 B2 | 9/2004 | Fountain | |
| 6,813,595 B2 | 11/2004 | Edgar | |
| 7,347,779 B2 * | 3/2008 | James-Herbert | 463/36 |
| 7,717,711 B2 * | 5/2010 | MacDonald | 434/55 |
| 2006/0046230 A1 | 3/2006 | MacDonald | |
| 2008/0284731 A1 | 11/2008 | Mak Pui See | |

* cited by examiner

*Primary Examiner* — Sam Yao
*Assistant Examiner* — Alvin Carlos
(74) *Attorney, Agent, or Firm* — Joseph R. Englander; Shutts & Bowen LLP (57) ABSTRACT

The subject invention provides a flight simulator, having a folded state and an unfolded state, having a chassis, an inner display and support that may be stowed or deployed, and an outer display and support that may be stowed or deployed.

16 Claims, 9 Drawing Sheets

FOLDABLE FLIGHT SIMULATOR

BACKGROUND OF THE INVENTION

The present invention relates to a foldable flight simulator. It applies particularly to a system, method and apparatus for simulating flight on a foldable, portable platform.

SUMMARY OF THE INVENTION

The subject invention provides a flight simulator, having a folded state and an unfolded state, having a chassis, an inner display and support that may be stowed or deployed, and an outer display and support that may be stowed or deployed.

One advantage of the present invention is to provide a compact, portable, flight simulator which is self contained.

Another advantage of the present invention is that it has a small footprint when deployed.

Another advantage of the present invention is that it is easy for one person to move, roll, deploy and stow.

Another advantage is that the invention has a modular design so that if a display or other piece of hardware fails it is easy to replace.

Another advantage is that the invention allows for mission rehearsal upon little notice, and is compact enough so that it may be used during deployment so that training and rehearsal may take place right up to the time the mission actually begins.

Another advantage of the present invention is that it is capable of being transported on ships if necessary

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE INVENTION

Figure 1:
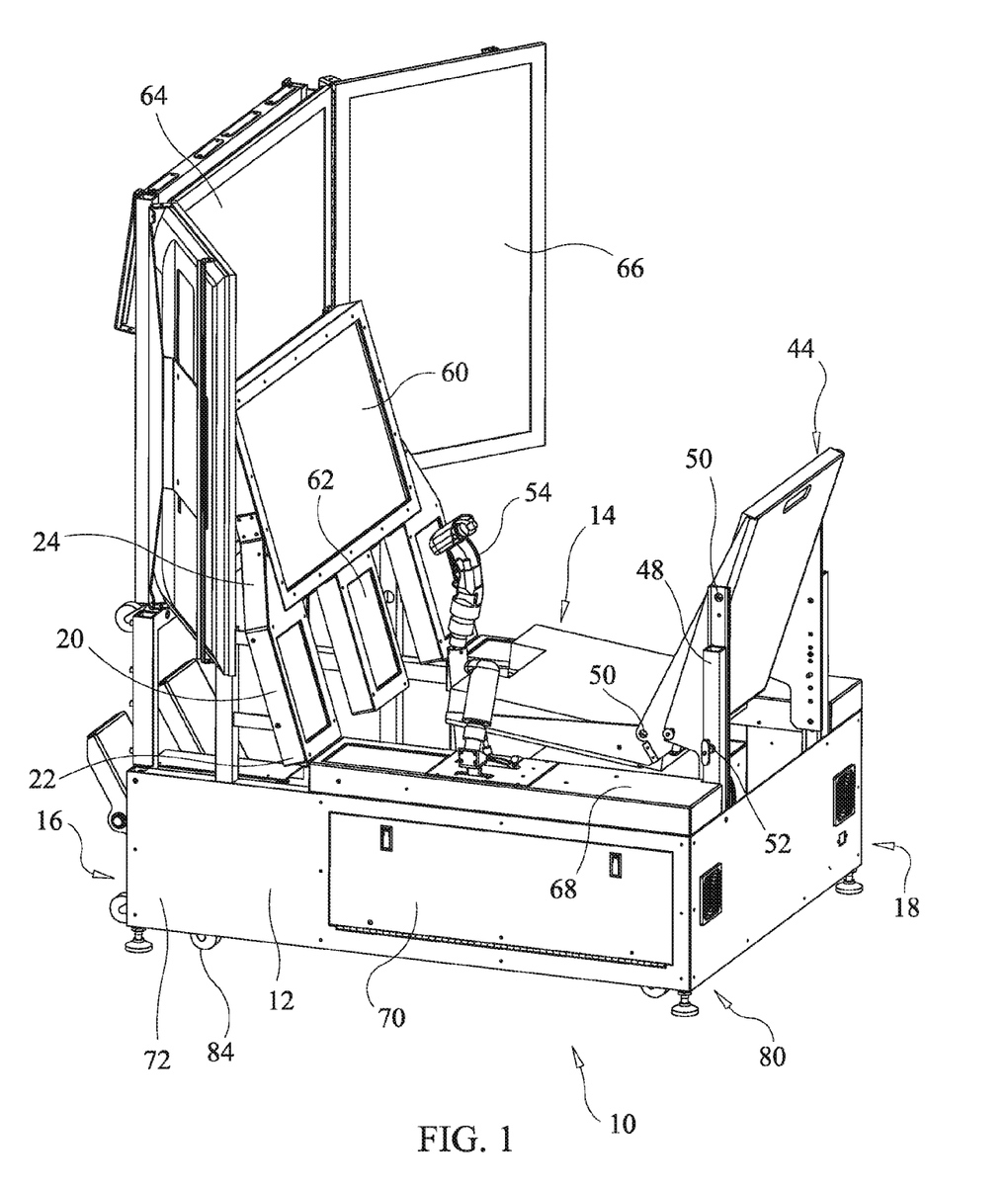
FIG. 1 is a side perspective view of an embodiment of the invention in a deployed configuration.
Figure 2:
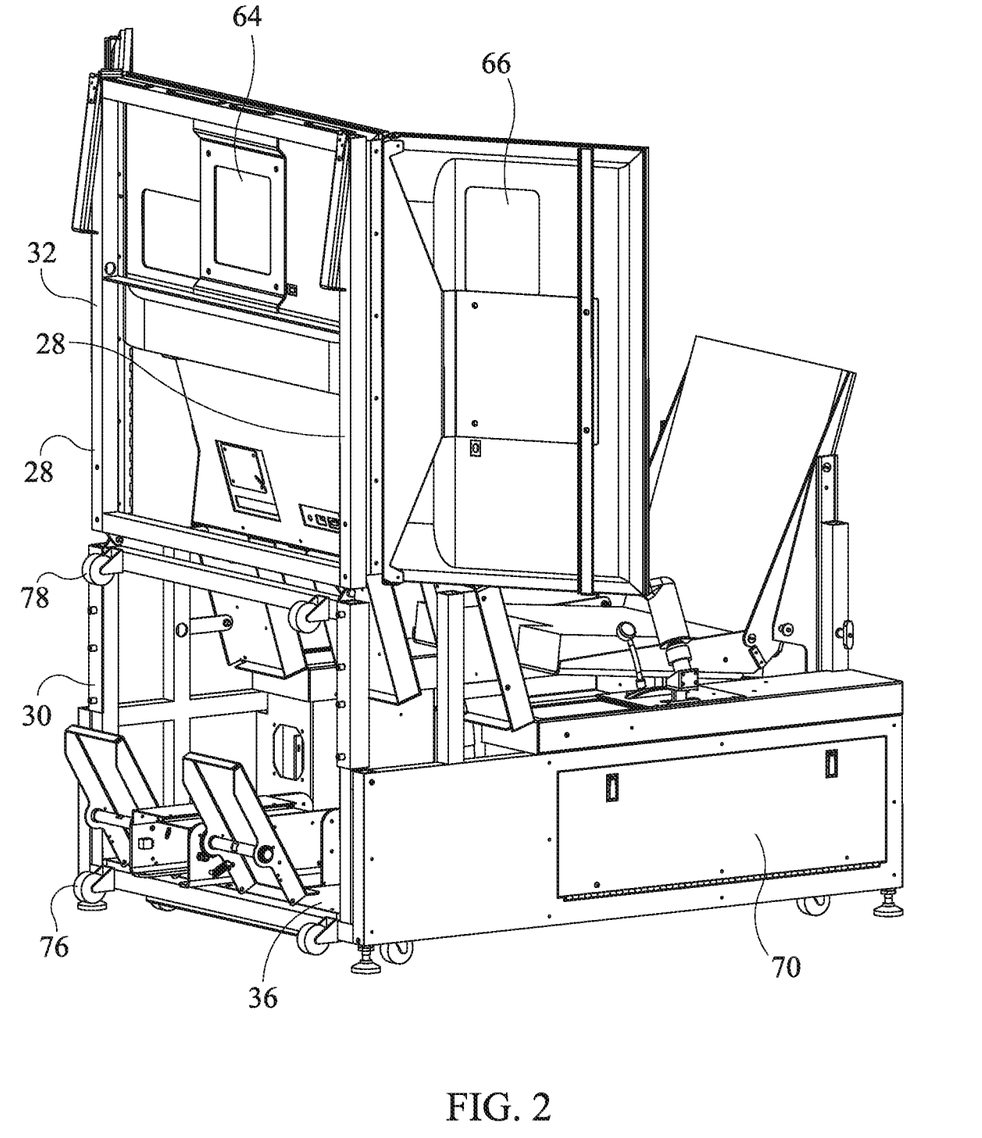
FIG. 2 is a rear perspective view of an embodiment of the invention in a deployed configuration.
Figure 3:
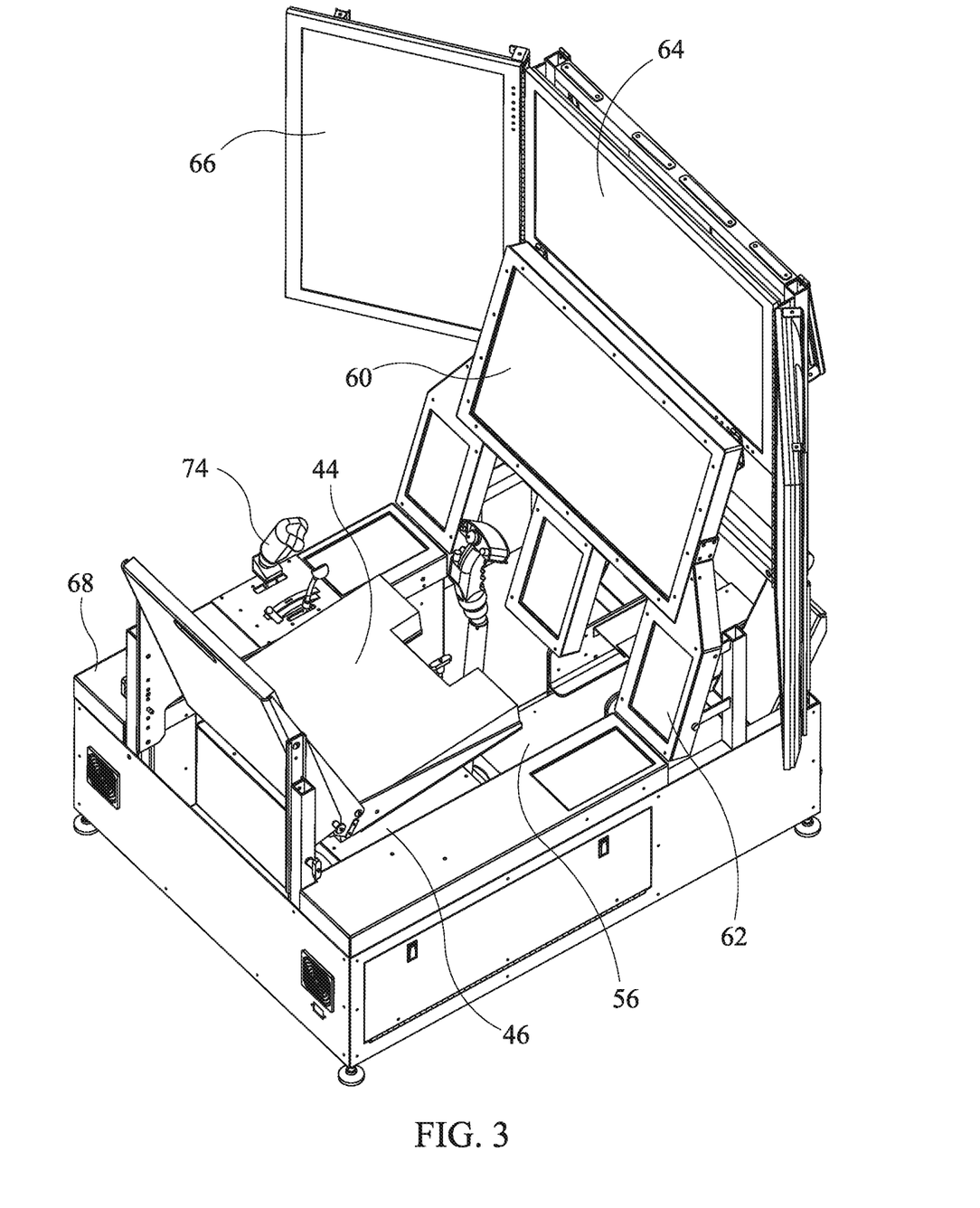
FIG. 3 is a top perspective view of an embodiment of the invention in a deployed configuration.

Referring to the Figures, wherein like numbers indicate corresponding parts throughout several views, a foldable flight simulator 10 is generally shown and is movable between an unfolded configuration, as shown in FIGS. 1-3 and a folded configuration, as shown in FIGS. 4-7.

The flight simulator 10 of the present invention comprises a chassis 12 having a top end 14, a front end 16 and a back end 18. The simulator 10 further includes at least one inner display support 20 having a stowed state and a deployed state connected to the front end 16 of the chassis 10 having a near portion 22 in connection with the chassis 10, a far portion 24, and at least one folding joint 26 to connect pivotally the near portion 22 to the far portion 24.

The simulator 10 also includes at least one outer display support 28 having a stowed state and a deployed state connected to the front end 16 of the chassis 12 having a near portion 30 in connection with the chassis 16, a far portion 32, and at least one folding joint 34 to connect pivotally the near portion 30 to the far portion 32.

Figure 4:
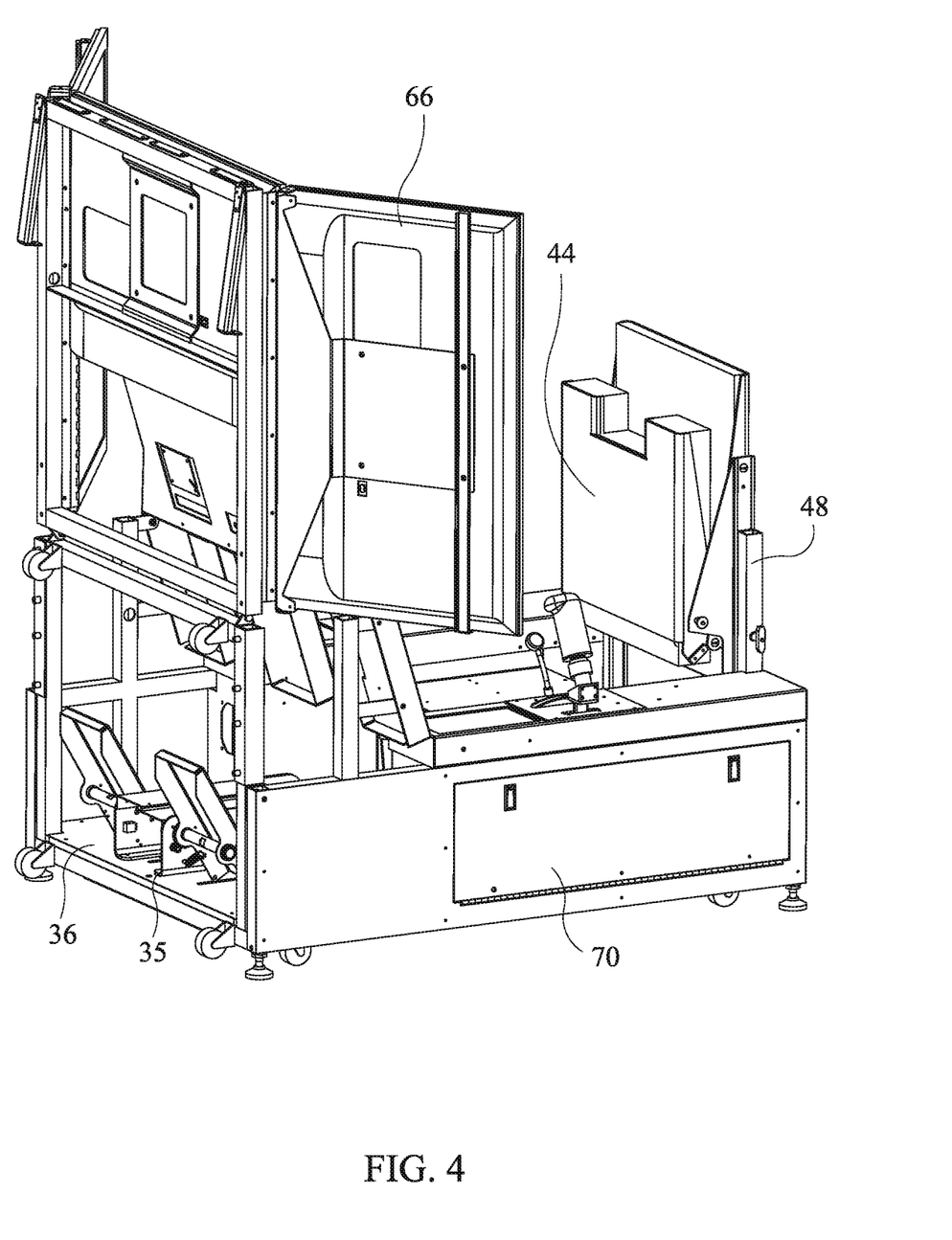
FIG. 4 is a side perspective view of an embodiment of the invention where the seat is in a partially stowed configuration and the pedals are in a stowed configuration.
Figure 4A:
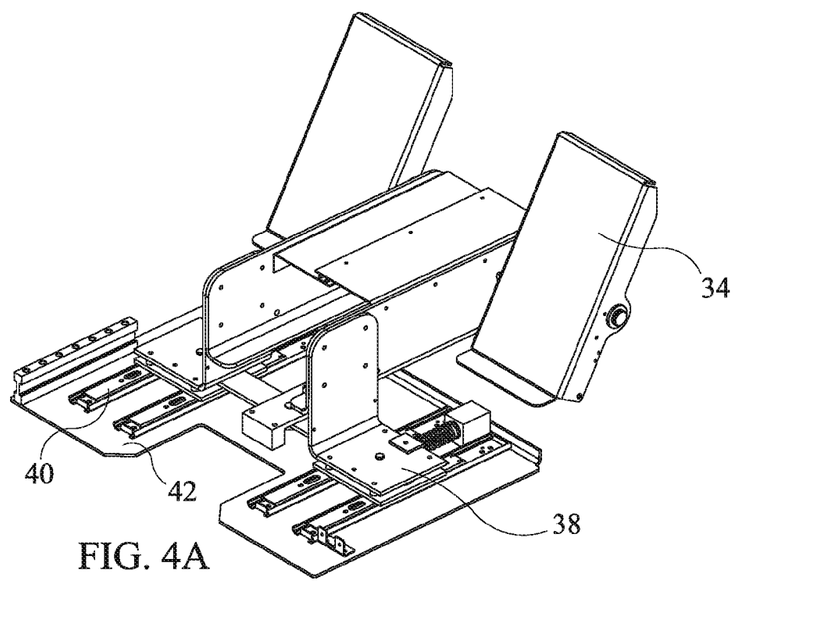
FIG. 4A is a perspective view of pedal assembly of the invention.

The chassis 12 may further include one or more adjustable foot pedals 35 having a stowed state and a deployed state located at an interior portion 36 of the front end 16 of the chassis 12. As shown in FIGS. 4 and 4A, the pedals 35 may be fixed to at least one slide carriage 38. In this embodiment, the slide carriage 38 is in slidable connection with at least one railing 40 attached to the interior portion 36 of the chassis 12. Alternatively, the railing 40 may be attached to a base 42 which in turn is attached to the interior portion 36 of the front end 16 of the chassis 12.

Figure 4B:
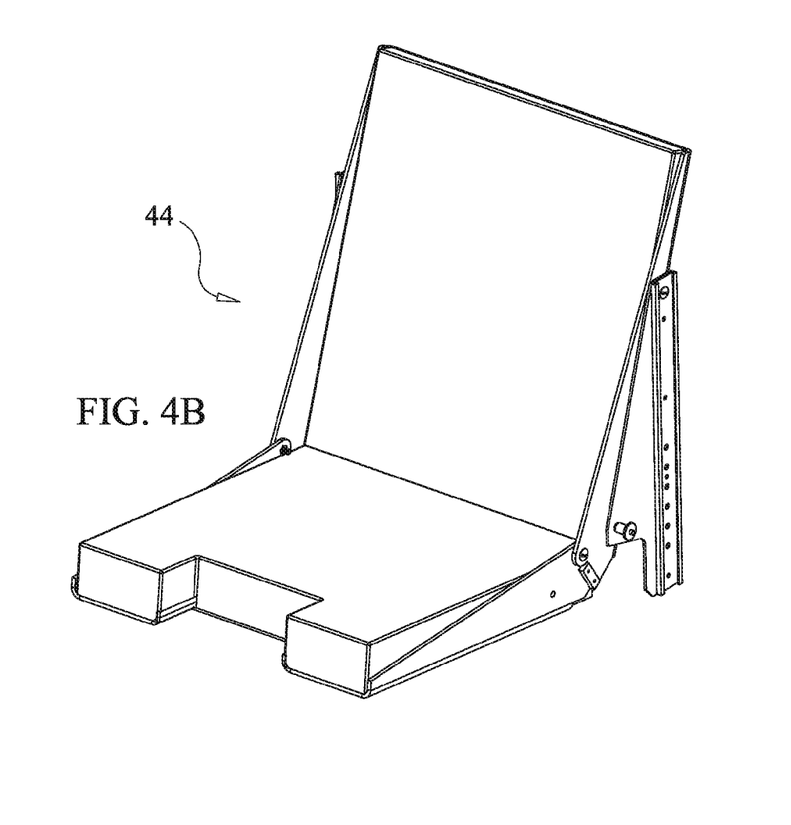
FIG. 4B is a perspective view of a seat of one embodiment of the invention.

The chassis 12 may also include a seat assembly 44 having a stowed state and a deployed state located at an interior portion 46 of the back end 18 of the chassis 12. The seat assembly 44 may include one or more seat supports 48. The seat assembly may also be foldable into its sowed state. The seat assembly 44 may also have one or more pivot joints 50 and a seat height adjustment mechanism 52, such as a telescoping pin mechanism for use with holes or grooves in the seat supports 48 or an equivalent height adjustment mechanism.

Figure 3A:
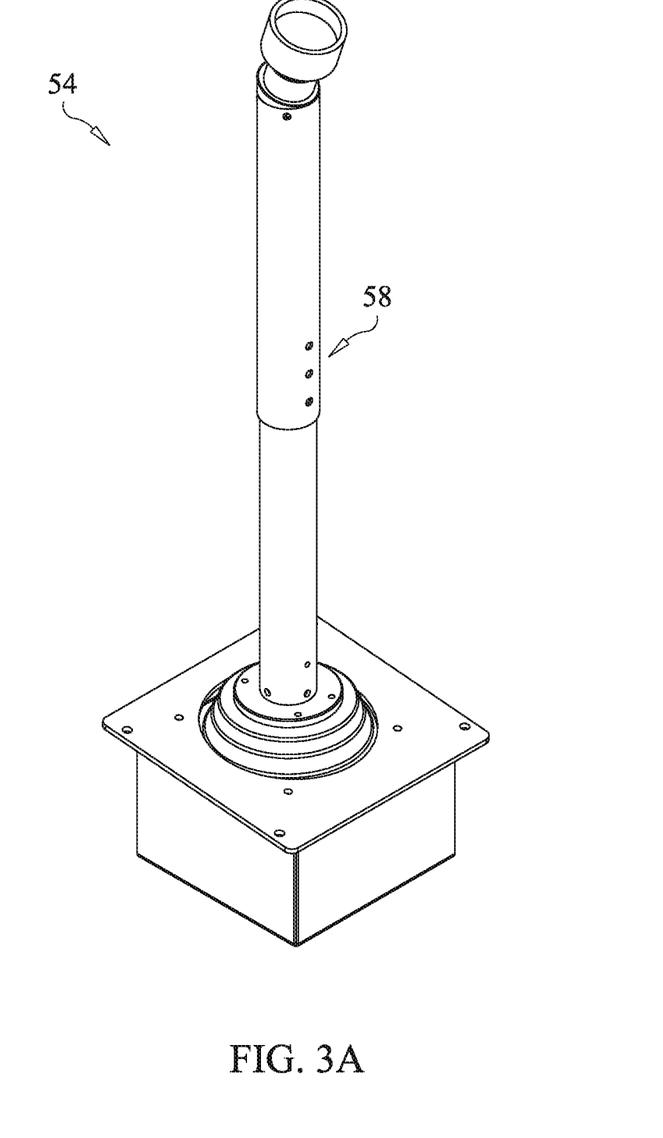
FIG. 3A is a perspective view of a primary controller of the invention.

The chassis may further comprise a primary controller 54 located at the interior portion 56 of the chassis at approximately the center of the chassis 12 so that the primary controller 54 may be manipulated by a person sitting in the seat assembly 44. The primary controller 54 may also have a telescoping construction to go between its stowed state and deployed state. For example, as shown in FIG. 3A, the primary controller 54 may have a telescoping construction and use a pin mechanism 58 for use with holes or grooves as described for the in the seat supports 48 or an equivalent height adjustment mechanism. The telescoping construction may also allow the height of the primary controller 54 in the simulator to be reduced for stowing.

Figure 5:
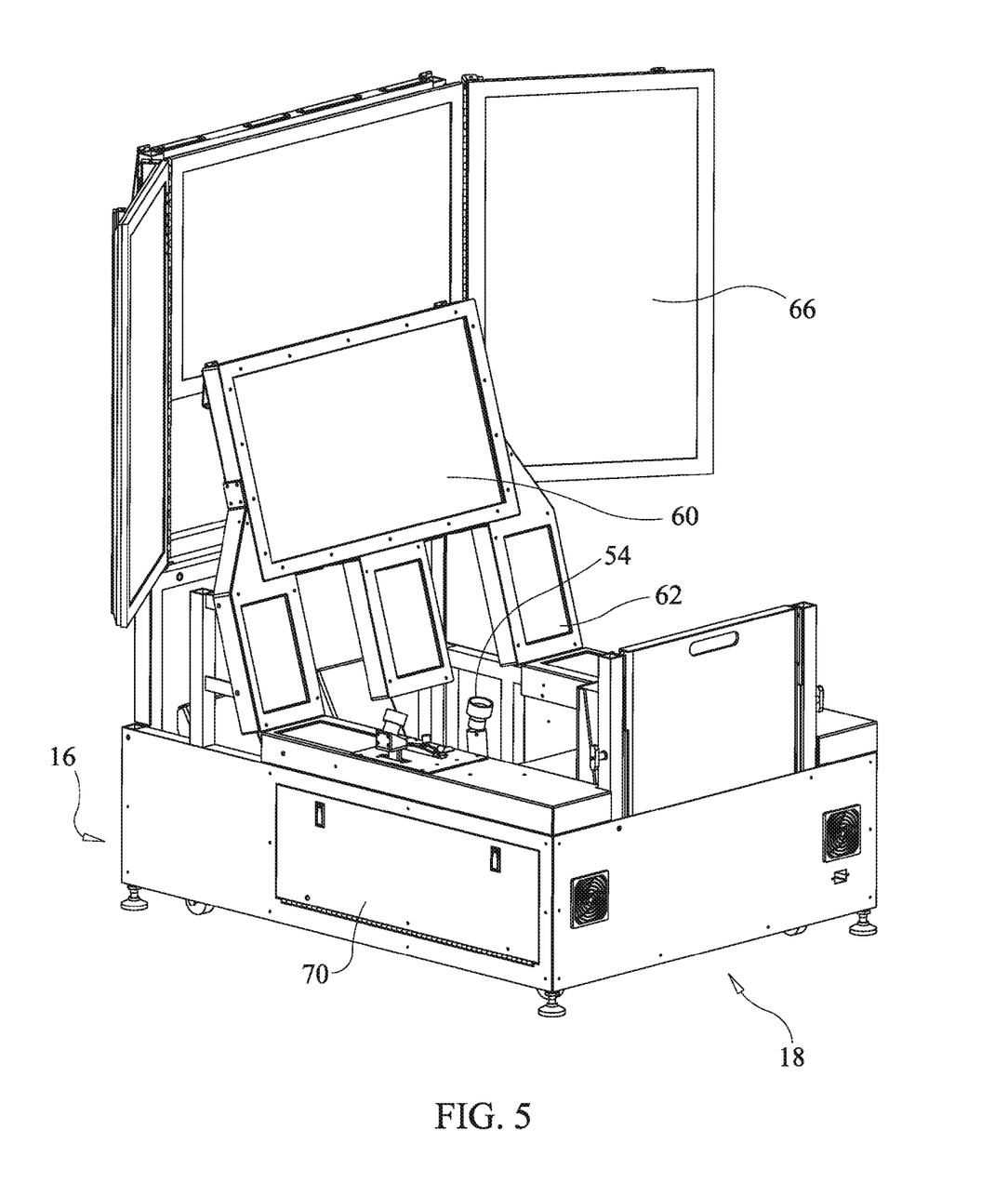
FIG. 5 is a side perspective view of an embodiment of the invention where the seat is in a stowed configuration and the primary controller is in a stowed configuration.
Figure 7:
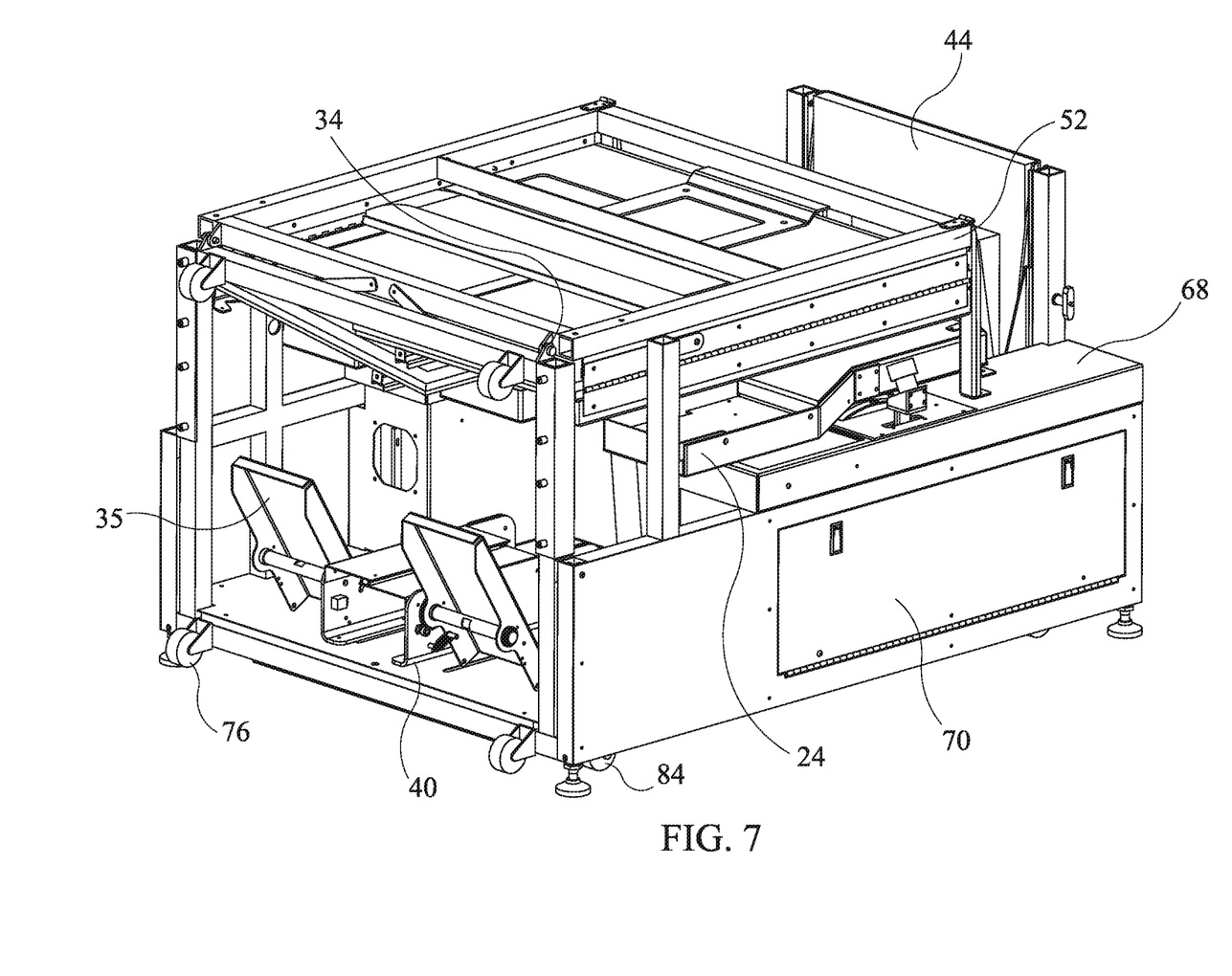
FIG. 7 is a side perspective view of an embodiment of the invention in the stowed configuration.

In addition, the inner display support 20 may be connected to at least one inner main display 60. The inner main display may be a video screen, a touch screen or an equivalent display known in the art. In addition, the inner display support 20 may also support at least one inner instrument display 62. As shown in FIGS. 1 and 3, three inner instrument displays 62 may be supported by the inner display support 20. An inner instrument display 62 may be a video screen, a touch screen, a tablet or an equivalent display known in the art. As shown in FIG. 1, FIG. 5 and FIG. 7, the inner main display 60 and inner instrument display 62 may be supported by the inner display support 20 so that the inner display support 20 may be put in the stowed state without affecting the mechanical connection with the inner displays 60, 62.

In addition, the outer display support 28 may be connected to at least one outer main display 64. Furthermore, the outer display support 28 may be connected to at least one outer secondary display 66 generally adjacent to the outer main display 64. As shown in FIG. 1-6 there may be an outer secondary display 66 on either side of the outer main display.

Also, as shown in FIG. 2 and FIG. 7, the outer main display 64 and outer secondary display 66 may be supported by the outer display support 28 so that the outer display support 28 may be put in the stowed state without affecting the mechanical connection with the outer displays 64, 66.

In addition, as shown in FIG. 7, the simulator 10 may be configured so that the stowed state of the inner display support 20 brings the far end 24 of the inner display support to a predetermined distance from a top surface 68 of the chassis. In addition, the stowed state of the outer display support may bring the far end 32 of the outer display support 28 to a predetermined distance further from the top surface 68 of the chassis 12 than the far end 24 of the inner display support 20 when stowed.

In another embodiment, the chassis 12 further comprises at least one closable compartment 70 on a side 72 of the chassis 12.

In still another embodiment, the flight simulator 10 includes a secondary controller 74 located on a top surface 68 of the chassis 12 accessible to a user in the seating assembly 44. In one embodiment, the primary controller 54 may be a stick for an airplane, and the secondary controller 74 may be a throttle. Alternatively, the primary controller 54 may be a cyclic for a helicopter, and the secondary controller 74 may be a collective.

With regard to making the foldable flight simulator more portable, at least one wheel 76 is located at the front end of the chassis 12, and at least another one wheel 78 located at the folding joint 34 of the outer display support 28, wherein the wheel 76 at the front end 16 of the chassis 12 and the wheel 76 at the folding joint 34 are coplanar upon configuration of the simulator 10 in the stowed state. Thus the wheels 76, 78 operate to ease rolling of the simulator 10.

Moreover, the bottom 80 of the flight simulator may comprise at least one leg 82 located on a bottom end of the chassis 12 so that the simulator is raised from the floor while in use. In addition, a bottom end wheel 84 located toward the front end 16 as shown in FIG. 1 may be included to make rolling on the bottom 80 and tilting the simulator onto its front end 16 easier for a user.

The operation of folding the flight simulator is generally as follows. Starting with the foldable flight simulator in operating position, the seat is folded and the pedals are stowed as shown in FIG. 4. The seat may then be placed in the folded position as shown in FIG. 5. Also, the primary controller may be lowered, such as by telescoping. A secondary controller may be removed from its place of use and may be placed in a place for storage on the chassis.

Figure 6:
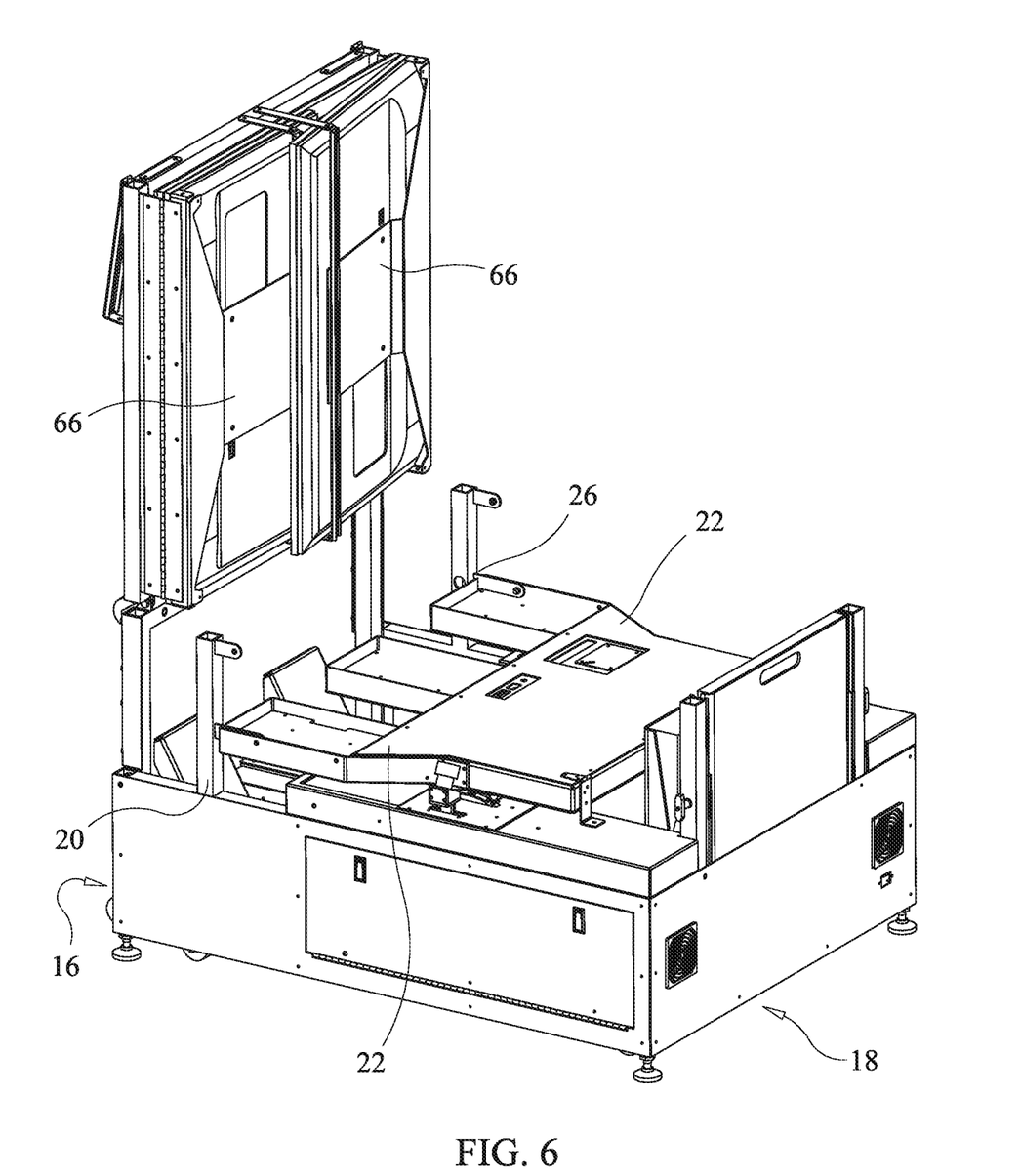
FIG. 6 is a side perspective view of an embodiment of the invention where the inner display support and is folded and the inner display is in stowed configuration and secondary outer displays are folded towards a primary outer display.

The inner display support is then folded toward the surface of the chassis, as shown in FIG. 6. The inner display is then secured to the chassis with at least one bracket.

The outer display is then placed in stowage configuration, as shown in FIG. 7. Secondary displays are folded toward the main outer display. Then the outer display support is folded toward the surface of the chassis. The outer display is then secured to the surface of the chassis with brackets. Deploying the flight simulator may be accomplished generally be reversing these steps.

It will be appreciated by persons skilled in the art that the present invention is not limited to what has been particularly shown and described herein above. It should be noted that the accompanying drawings are not to scale. A variety of modifications, variations, shapes and sizes are possible in light of the above teachings without departing from the scope and spirit of the invention.

What is claimed is:

1. A flight simulator, having a folded state and an unfolded state, comprising:
    a chassis, having a top end, a front end and a back end,
    an inner support attached to at least one inner display, said inner support having a stowed state and a deployed state connected to the front end of the chassis having a near portion in connection with the chassis, a far portion, and at least one folding joint to pivotally connect the near portion to the far portion,
    said inner display comprising multiple inner display screens;
    an outer support attached to at least one outer display, said outer support having a stowed state and a deployed state connected to the front end of the chassis having a near portion in connection with the chassis, a far portion, and at least one folding joint to pivotally connect the near portion to the far portion,
    said chassis further comprising
    a left arm comprising a left arm display, and
    a right arm comprising a right arm display.

2. The flight simulator of claim 1, wherein the chassis further comprises adjustable pedals having a stowed state and a deployed state located at an interior portion of the front end of the chassis.

3. The flight simulator of claim 1, wherein the chassis further comprises a seat assembly having a stowed state and a deployed state located at the back end of the chassis.

4. The flight simulator of claim 1, wherein the chassis further comprises an adjustable primary controller having a stowed state and a deployed state located approximately at the center of the chassis extending towards the top end of the chassis.

5. The flight simulator of claim 1, wherein the inner display support is connected at to
    at least one inner main display, and
    at least one inner instrument display.

6. The flight simulator of claim 1, wherein the outer display support is connected to
    at least one outer main display, and
    at least one outer secondary display at the far portion of the outer display support.

7. The flight simulator of claim 1, wherein the chassis further comprises at least one closable compartment on a side of the chassis.

8. The flight simulator of claim 1, further comprising at least one wheel located at the back end of the chassis, and at least one wheel located at the folding joint of the outer display support, wherein the wheel at the back end of the chassis and the wheel at the folding joint are coplanar upon configuration of the outer support display in the stowed state.

9. The flight simulator of claim 2, wherein the pedals are connected to at least one slide carriage in slidable connection with at least one railing attached to an interior portion of the chassis.

10. The flight simulator of claim 8, further comprising at least one leg located on a bottom end of the chassis.

11. The flight simulator of claim 8, further comprising at least one wheel located on a bottom end of the chassis toward the front end of the chassis.

12. The flight simulator of claim 4, wherein the primary controller comprises telescoping construction.

13. The flight simulator of claim 4, further comprising a secondary controller located on a side of the chassis, wherein the primary controller is a cyclic, and the secondary controller is a collective.

14. The flight simulator of claim 4, further comprising ga secondary controller, wherein the primary controller is an airplane stick, and the secondary controller is a throttle.

15. The flight simulator of claim 6, wherein the outer display support is connected to
- at least one outer main display, and
- at least one outer secondary display at the far portion of the outer display support and
- wherein the stowed state of the inner display support brings the inner display to a predetermined distance from the top of the chassis, and
- wherein the stowed state of the outer display support brings the outer display to a predetermined distance further from the from the top of the chassis than the inner display.

16. The flight simulator of claim 15,
- wherein the inner display comprise a large central main display and three lower auxiliary displays.

\* \* \* \* \*